United States Patent
Huber et al.

(10) Patent No.: US 8,905,389 B2
(45) Date of Patent: Dec. 9, 2014

(54) APPARATUS FOR MOUNTING WORKPIECES TO BE MEASURED

(75) Inventors: Alfred Huber, Eppelborn (DE); Franz-Rudolf Junker, Tholey-Sotzweiler (DE)

(73) Assignee: Junker & Partner GmbH, Tholey (DE)

( * ) Notice: Subject to any disclaimer, the term of this patent is extended or adjusted under 35 U.S.C. 154(b) by 550 days.

(21) Appl. No.: 12/925,160

(22) Filed: Oct. 14, 2010

(65) Prior Publication Data

US 2011/0062643 A1    Mar. 17, 2011

(51) Int. Cl.
 *B23Q 1/70* (2006.01)
 *G01B 5/00* (2006.01)

(52) U.S. Cl.
 CPC .................................. *G01B 5/0004* (2013.01)
 USPC ........................................ 269/59; 269/289 R

(58) Field of Classification Search
 CPC .......... B25B 1/22; B25B 1/2484; B25B 1/00; B25B 11/005; B25H 1/0007; B23Q 1/28; B66F 7/22
 USPC ............................. 269/59, 55, 21, 900, 289 R
 See application file for complete search history.

(56) References Cited

U.S. PATENT DOCUMENTS

| 7,584,947 | B2 * | 9/2009 | Freeland | 269/296 |
| 7,918,440 | B2 * | 4/2011 | Schiavi et al. | 269/21 |
| 8,079,578 | B2 * | 12/2011 | Bumgarner et al. | 269/21 |
| 2001/0020762 | A1 * | 9/2001 | Helm et al. | 269/21 |
| 2009/0057971 | A1 * | 3/2009 | Bumgarner et al. | 269/21 |
| 2011/0062643 | A1 * | 3/2011 | Huber et al. | 269/59 |

FOREIGN PATENT DOCUMENTS

| DE | 195 31 520 | 1/1997 |
| DE | 29 911 395 | 9/2000 |
| DE | 103 57 261 | 6/2005 |
| DE | 10 2005 013 679 | 10/2006 |

* cited by examiner

*Primary Examiner* — Lee D Wilson
(74) *Attorney, Agent, or Firm* — Jordan and Hamburg LLP

(57) ABSTRACT

Disclosed is an apparatus for mounting workpieces to be measured, in particular sheet metal parts of a vehicle body, in a reference position, comprising a plurality of mounts each of which has a support column and can be moved on a support surface into a desired position, and further comprising connecting devices which can be fixed to the support columns and comprise an element for connecting to a support head which rests against the workpiece and is disposed in accordance with the desired position. The connecting element can be adjusted while compensating for deviation of the mount from the desired position.

1 Claim, 3 Drawing Sheets

A PPARATUS FOR MOUNTING WORKPIECES TO BE MEASURED

BACKGROUND OF THE INVENTION

The invention relates to an apparatus for mounting workpieces to be measured, and particularly sheet metal parts of a vehicle body, in a reference position, comprising a plurality of mounts, which each have a support column and can be moved on a support surface into a desired position, and comprising connecting devices which can be fixed to the support columns, and comprise an element for the connection to a support head which rests against the workpiece and is disposed in accordance with the desired position.

The use of apparatuses of this type is known. The support columns of the mounts of these known apparatuses protrude vertically from a base plate. Beneath the base plate an air cushion can be generated, on which the mount can be moved into the desired position on the support surface. The connecting device can be placed on the upper ends of the support columns and fixed there. In order to hold a sheet metal body part, for example, at least three such mounts are positioned on the support surface.

SUMMARY OF THE INVENTION

It is the object of the invention to create a new apparatus of this sort, which allows workpieces to be mounted in a reference position with decreased work expenditure and higher accuracy than with the known apparatus.

The apparatus according to the invention, which achieves this object, provides that the connecting element can be adjusted while compensating for deviation of the mount from the desired position.

Advantageously, the process of positioning the mounts itself does not require that large amounts of time and work be expended in order to achieve high accuracy. After positioning the mount on the support surface in a relatively approximate manner, the necessary positioning accuracy of the support heads is achieved with little effort by adjusting the connecting devices.

The connecting element of the connecting device preferably comprises a support surface for the support head which is parallel to the support surface for the mount and which can be displaced parallel to the support surface for the mounts.

The connecting element advantageously comprises a carriage that can be moved parallel to the support surface for the mounts. In a particularly preferred embodiment, the connecting element comprises two carriages that can be moved crosswise to each other. In this way, deviations of the mount from the desired position on the support surface can be completely compensated for.

The carriage can advantageously be moved in a dovetail guide.

The carriage can be displaced and fixed by screws engaging on opposing points of a pin protruding into an oblong hole in the carriage.

In a further embodiment of the invention, the connecting element is disposed on the upper side of a block forming the connecting device. In particular, the block comprises an opening on the underside for receiving the upper end of the support column.

The mount can advantageously be moved on the support surface manually or by a moving device. In a preferred embodiment, the mount can be moved on an air cushion.

The invention will be described in more detail hereinafter, based on an embodiment and the accompanying drawings, which make reference to this embodiment. In the drawings:

DESCRIPTION OF THE PREFERRED EMBODIMENTS

An apparatus for mounting workpieces to be measured comprises mounts 2 which can be moved on a flat support floor, the mounts having a base part 3 and a support column 4 protruding vertically from the base part 3.

Figure 1:
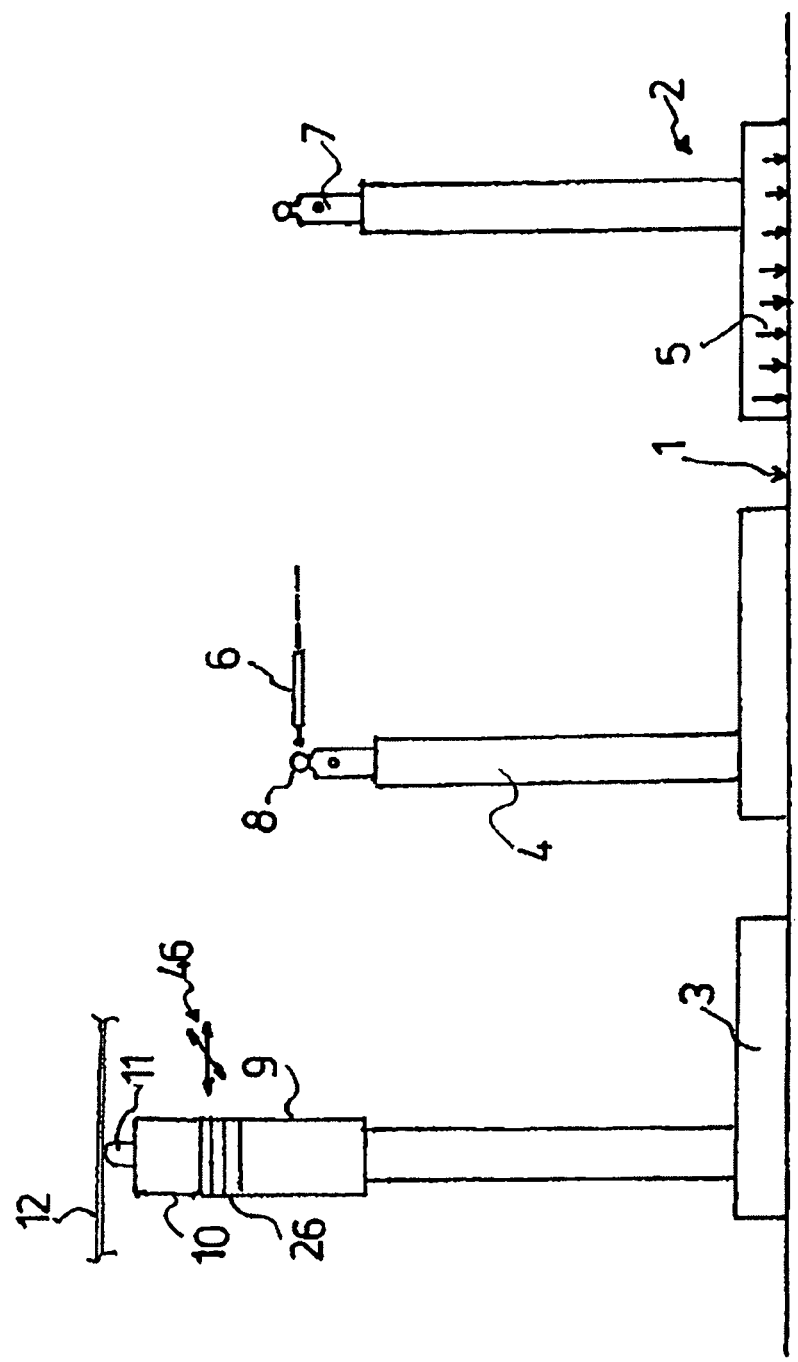
FIG. 1 is a schematic illustration of an apparatus according to the invention for mounting workpieces to be measured.

FIG. 1 shows three mounts 2 by way of example. However, the mounting apparatus could comprise a larger number of such mounts. The length of the support columns may be adjustable and/or support columns having different lengths can be connected to the base parts 3.

As is indicated by arrows 5, an air cushion can be generated beneath the base parts 3 so as to allow the mounts 2 to be moved easily on the support floor 1 and allow each of them to be brought into the desired positions on the support floor in accordance with a workpiece to be held. The transfer into the desired position can be done manually, or by way of a suitable moving device. The exact positions of the mounts can be determined by way of a measurement sensor 6 of a 3D measuring machine, the remainder of which is not shown, wherein advantageously a ball head 8 of an end piece 7 of the support columns 4 forms a reference point.

The mounting apparatus shown in FIG. 1 further comprises adapter or connecting devices 9 which can be placed on the support columns 4 for connecting the mounts 2 to a support head 10, wherein the support head 10 comprises a contact element 11, for example for the punctiform support of a workpiece 12, such as a sheet metal component of a vehicle body.

FIG. 1 shows by way of example only one mount having a connecting device and a support head. Connecting devices 9 and support heads 10 can be provided on the support columns of the remaining mounts, wherein the particular embodiments of the support heads may vary.

Figure 3:
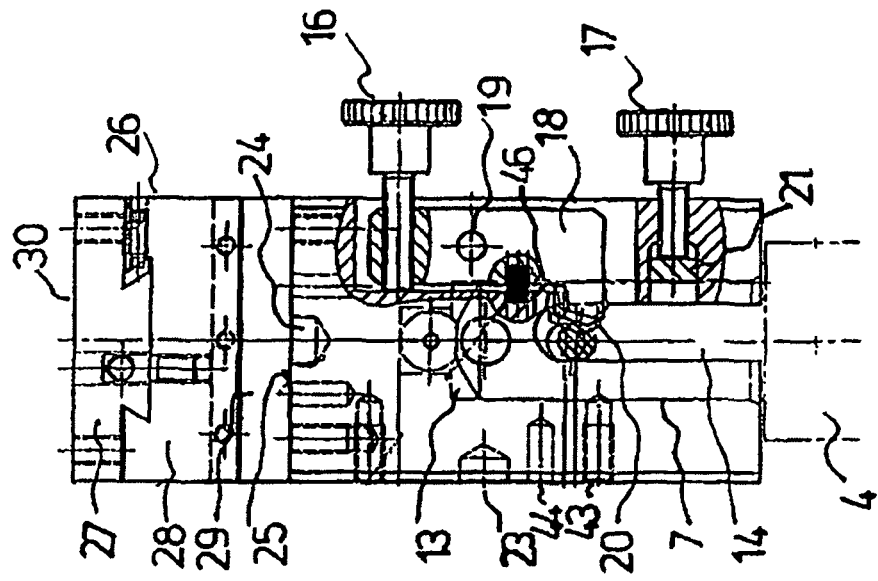
FIG. 3 is a further side view rotated by 90° of the connecting device of FIG. 2, and FIGS. 4 and 5 are different side views of an adjustable connecting element of the connecting device of FIGS. 2 and 3.
Figure 2:
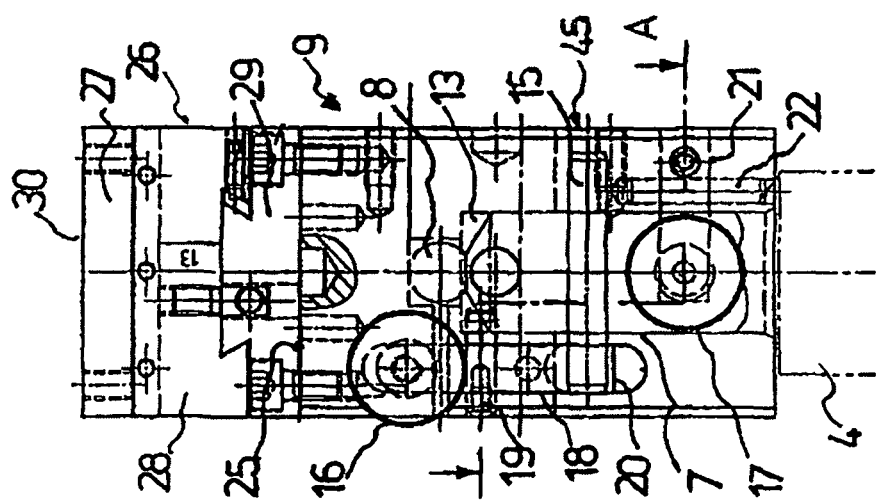
FIG. 2 is a side view of a connecting device that can be used in the apparatus of FIG. 1.

An embodiment of a connecting device 9 shown in FIGS. 2 and 3 comprises a block 45, which can be placed on the support column 4, wherein the end piece 7 of the support column 4 protrudes with the ball head 8 into an opening 13 on the underside of the block 45. Slots 14 are configured on opposing longitudinal sides of the opening 13, and the ends of a pin 15 which protrudes on both sides from the end piece 7 and is disposed perpendicular to the longitudinal axis of the end piece 7 engage in these slots.

In the embodiment shown, two adjusting screws 16 and 7 are used to fix the connecting device 9 on the support column 4.

The adjusting screw 16 pivots a rocker 18 about a rotational axis 19, wherein a nose 20 connected to the rocker 18 latches behind the pin 15 and a bevel formed at the nose ensures a tractive force directed into the opening 13. At 46, a stop is formed for the rocker 18.

The adjusting screw 17 actuates a rocker 21, which can be pivoted about a rotational axis 22 by the adjusting screw 17 and has a contact surface which corresponds to the lateral surface of the end piece 7 and rests against the lateral surface of the end piece 7, generating a radial clamping force.

In this way, the adjusting screws 16, 17 can be used to hold the end piece 7 with precise fit in the recess or opening 13 and fix the connecting device 9 in a defined position on the support column 4.

A countersink 23, the cone of which is located at the inner end, is configured on each of the four sides of the block 45 forming the connecting device 9 so as to form a reference point for a measurement sensor, for example the measurement sensor 6. Another such countersink 24 is located on the upper side of the block 45 in a support surface 25 used to receive an element 26 for the connection to the support head 10.

Figure 5:
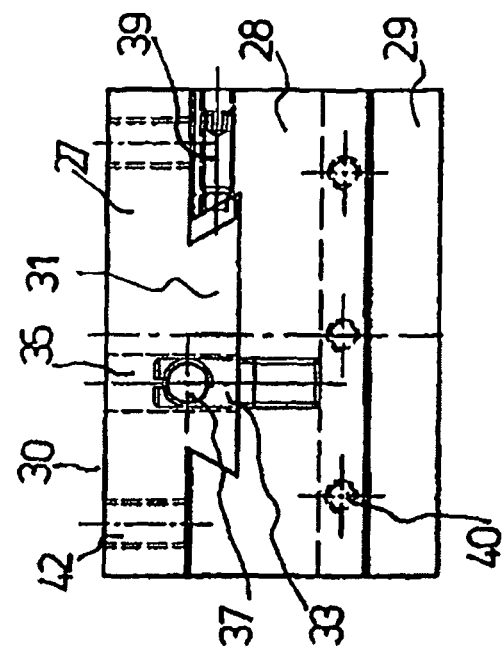
Figure 4:
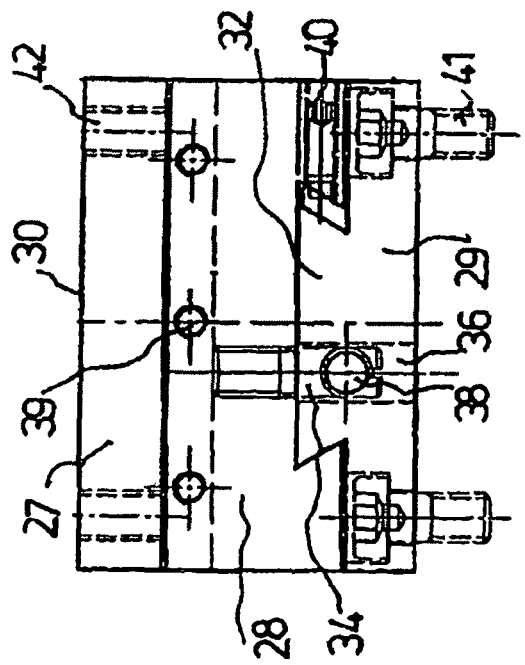

In the embodiment shown, the connecting element 26 illustrated separately in FIGS. 4 and 5 is configured in three pieces having an upper carriage part 27, a lower carriage part 28, and a base part 29. The base part 29 rests against the support surface 25. The upper carriage part 27 comprises a support surface 30 for the connection to the support head 10.

A dovetail guide 31 is configured between the carriage parts 27, 28. A dovetail guide 32 that is perpendicular to the dovetail guide 31 is present between the lower carriage part 28 and the base part 29.

Stud screws 33 and 34, fixed in the lower carriage part, each protrude into an oblong hole 35 or 36 in the upper carriage part 27 or in the base part 29. Screws can be screwed into threaded holes 37 and 38 extending in the direction of the respective dovetail guide 31 or 32, with the ends of the screws engaging on the stud screws 33 and 34 at mutually opposing points. These screws can be used to displace and fix the carriage parts 27, 28 in the dovetail guides 31, 32. Three screws 39 or 40 can be used for further fixing the carriage parts in the dovetail guides.

Four screws 41 are provided for connecting the element 26 to the block 45. The upper carriage part comprises four threaded holes 42 for a screw connection to the support head 10. Boreholes for receiving locating pins in the base part 29 and in the upper carriage part 27 are not shown in FIGS. 4 and 5.

Reference numerals 42 and 43 indicate a threaded hole and a preformed hole for fastening an additional part to the connecting element 9.

The invention claimed is:

1. An apparatus for mounting a workpiece of a vehicle body into a reference position for being measured, comprising:
    a plurality of mounts, each one mount of the plurality of mounts having a support column and being movable about a support surface into a desired position. and
    a plurality of connecting devices removably fixed to corresponding mounts at the corresponding mount's support column, each one connecting device including an element for connecting said one connecting device to a corresponding support head disposed in accordance with the desired position for contacting the workpiece, the connecting element being adjustable to compensate for deviation of the corresponding mount from the desired position; and
    wherein the connecting element comprises a carriage that is movable parallel to the corresponding mount's support surface;
    wherein the carriage is a first carriage, and connecting element further comprises a second carriage, the first carriage and second carriage movable crosswise relative to each other;
    wherein each carriage is movable and fixable within a corresponding dovetail guide; and
    wherein the connecting element further comprises a screw and a pin, the screw engaging a thread of the first carriage, the pin fixed in the second carriage and protruding to engage an oblong hole in the first carriage, wherein an end of the screw contacts the pin for displacing and fixing the first carriage.

* * * * *